Patented Jan. 29, 1929.

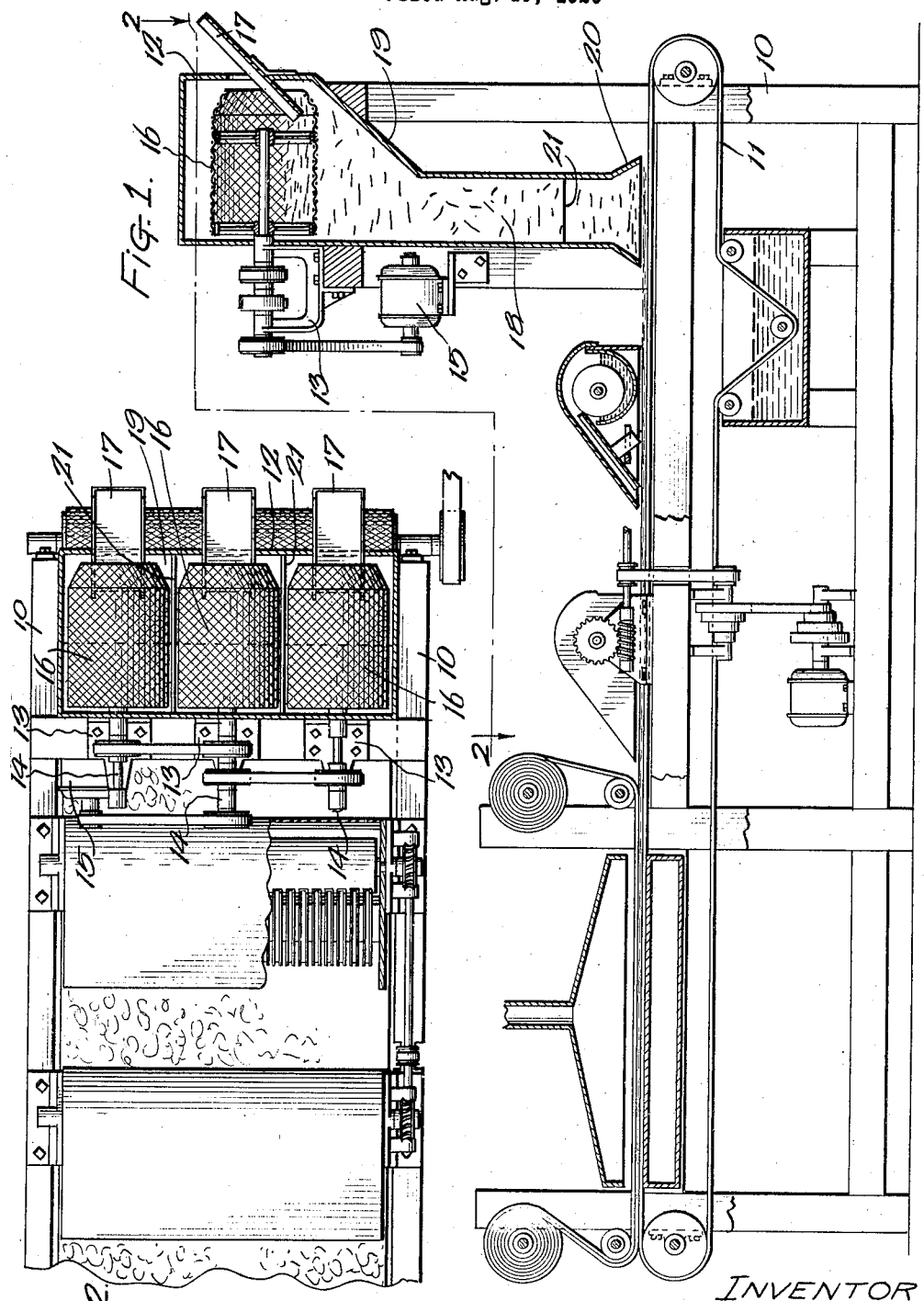

1,700,403

UNITED STATES PATENT OFFICE.

LOUIS T. FREDERICK, OF VALPARAISO, INDIANA, ASSIGNOR TO CHICAGO MICA COMPANY, OF VALPARAISO, INDIANA, A CORPORATION OF ILLINOIS.

MICA-LAYING MACHINE.

Application filed August 19, 1926. Serial No. 130,297.

This invention relates generally to the machines and apparatus for the manufacture of mica plate and particularly to those portions thereof that have to do with the laying or even distribution of mica flakes or scales upon a substantially horizontal bed or carrier.

It is the object of the present invention to improve the mechanism for distributing or laying the mica flakes or scales by eliminating, counteracting and reducing the air currents effecting the precipitating or falling mica and which cause such an uneven distribution thereof on the bed or carrier that the resulting plate is not of an even and uniform thickness.

Another object of the present invention is to provide several distinct supplies of mica flakes or scales to be precipitated simultaneously upon the bed or carrier, the mica precipitating or falling from such sources of supply uniformly and evenly, intermingling prior to contacting with said bed or carrier.

With the above and other objects in view, as will be apparent, this invention consists in the construction, combination and arrangement of parts, all as hereinafter more fully described, claimed and illustrated in the accompanying drawing, wherein Figure 1 is an elevation view, with parts broken away and in section, of a mica laying machine embodying the present invention; and, Figure 2 is a horizontal-cross section thereof taken substantially along line 2—2 in Figure 1.

Heretofore it has been customary in the manufacture of mica plate to endeavor to distribute mica flakes or scales in an even, uniform layer on a horizontal bed or carrier where they are treated with shellac or other cementitious material to weld or form the same into a homogeneous mass or plate. As the present invention relates only to the distribution of the mica flakes or scales, the other steps of the methods and the apparatus for carrying them out will be generally disregarded except as may be necessary to an understanding of this invention.

Mica flakes or scales have been heretofore distributed upon the horizontal bed or carrier by placing them in a drum, the wall of which is of screening or is perforated to permit the mica flakes or scales to pass therethrough. This drum has been placed at the upper end of a relatively long and large shaft or conduit at the other end of which is stationed the horizontal bed or carrier. The drum was then rotated causing the mica flakes or scales therein to pass through the wall thereof and precipitate or "snow" downwardly through the shaft or conduit upon the bed or carrier. The theoretical result of this procedure has been to uniformly and evenly distribute the mica flakes or scales over the surface of the bed or carrier. However, mica flakes or scales are very light and therefore are easily affected by even slight air currents so that frequently instead of being uniformly and evenly distributed, directly opposite results are obtained in varying degrees producing mica plate with thin spots therein. In other words, it has been found to be difficult in practice, using the machines prior hereto, to produce mica plate of uniform thickness. The present invention is designed to overcome the objectionable characteristics of these prior machines by eliminating or counteracting the effect of the air-currents on the precipitating or falling mica flakes or scales and insuring a more even and uniform distribution on the bed or carrier. This is accomplished first by restricting the shaft or conduit through which the flakes or scales pass enroute from the drum to the bed or carrier; second, by providing a plurality of drums, insuring individual sources of supply for various portions of the surface of the bed or carrier, the flakes or scales from which intermingle prior to contacting with the bed or carrier; and third, the shaft of conduit may be divided vertically by partitions extending downwardly from between the drums to points short of the lower end of the shaft or conduit. In this manner the action of air currents is very materially reduced and such action as remains causes the streams of mica flakes or scales from the several drums to intermingle where they adjoin and before they contact with the bed or carrier.

Reference being had more particularly to the drawing, 10 designates the frame of a machine for the manufacture of mica plate. Supported by the frame 10 is the movable carrier 11 upon which the mica flakes or scales precipitate or fall. This carrier cooperates first with the mica laying or distributing mecahnism forming the subject matter of the present invention and subsequently with the various other mechanism used in the manufacture of plate mica and which form no part hereof and therefore are merely shown diagrammatically in the drawing.

The frame 10 of the machine is extended above the level of the carrier 11 at the front end of the machine and there supports a hopper 12 substantially rectangular in horizontal section. This hopper is situated considerably above the front end of the carrier 11 and extends transversely across the same.

One side of the hopper 12 is straight and has a series of bearings 13 adjoining it on the exterior thereof. These bearings 13 carry the counter shafts 14 which project into and partly through the hopper 12. The counter shafts are driven from the motor or other source of power 15 by any standard system of belting, shafting or gearing.

Within the hopper 12 each shaft 14 carries a drum 16 of screening or other perforated material through which the mica flakes or scales may pass. The ends of the drum 16 opposed to the bearings 13 are tapered and open for the reception of the chutes 17. These chutes 17 pass through the wall of the hopper 12 adjacent the open ends of the drums 16, and extend into said drums. As these chutes 17 are inclined downwardly mica flake or scale may be placed in the outer ends thereof to gravitate into the drums. Thus the drums 16 may be kept filled with mica flake or scale. There is one of these stationary chutes 17 for each drum 16.

A shaft or conduit 18 is located below the hopper 12, one side of which is a continuation of the side of the hopper 12 pierced by the shaft 14. The opposite side of the shaft or conduit 18 is positioned inwardly from the vertical plane of the wall of the hopper having the chutes 17 therein and is connected to the lower end of the same by the sloping wall 19. In this manner a shaft or conduit is provided for cooperation with the hopper, that is, as long as the hopper but is of considerably less width than the width thereof.

At its lower end the shaft or conduit 18 is flared as at 20 for facilitating the delivery of the mica flakes or scales passing through said shaft or conduit to the carrier 11.

A series of vertical parallel partitions 21 may be provided in the hopper 12 to extend into the shaft or conduit 18 to points removed from and above the flared end thereof. There may be one of these partitions between each pair of drums 16.

In operation the drums 16 are rotated from the motor 15. This rotation causes the mica flakes or scales to pass through the walls of the drums to be guided by the sloping wall 19 into the relative narrow shaft or conduit 18. In the form of the invention shown in the drawing, there being three drums, there are consequently three sources of supply of mica flakes or scales discharging three clouds or streams thereof into the shaft or conduit 18. As the shaft or conduit 18 is relatively narrow the effect of air currents therein on the mica passing therethrough is only slight, and being largely transverse of the movement of the mica, is effective to cause a uniform mingling of the three streams or clouds of mica prior to the discharge thereof through the flared end 20 of said shaft or conduit.

By providing more than one drum to supply mica to the shaft or conduit 18 a positive supply is assured throughout the said conduit. This positive supply of mica throughout the conduit or shaft 18 assures the discharge from the flared end 20 of the shaft or conduit which will be practically uniform in quantity at all points.

If the partitions 21 are used the air currents cannot very greatly affect the relative positions of the mica flakes or scales passing through the conduit or shaft 18. This is an additional safeguard to prevent a greater supply of mica flake or scales being discharged at one point than at another. Inasmuch as the partitions 21 terminate above the flared end of the shaft or conduit 18 the streams or clouds of mica flakes or scales between said partitions are allowed to uniformly intermingle below the ends of said partitions but not sufficiently to cause an uneven or nonuniform distribution thereof when discharged from the lower end 20 of the conduit or shaft 18.

Having thus described my invention what I claim as new and desire to secure by Letters Patent is:

1. A mica laying machine having a hopper, a relatively restricted conduit leading from said hopper, a series of perforated parallel drums closely situated relatively to each other for independently and simultaneously delivering mica into said conduit, and partitions between said drums and extending into said conduit to points removed from the discharge end thereof.

2. A mica laying machine having a hopper, a conduit leading from said hopper, partitions dividing said hopper into a plurality of compartments, said partitions extending partially into said conduit, and means for delivering mica flakes into said compartments.

3. A mica laying machine having a discharge conduit, partitions dividing said conduit into a plurality of channels, said partitions extending to adjacent the discharge end of said conduit and means for independently and simultaneously feeding mica flakes as a cloud into said channels.

In witness whereof, I have hereunto subscribed my name.

LOUIS T. FREDERICK.